US012634238B2

(12) United States Patent
Francois et al.

(10) Patent No.: US 12,634,238 B2
(45) Date of Patent: May 19, 2026

(54) BIDIRECTIONAL RING-BASED INTERCONNECTION NETWORKS FOR MULTIPROCESSORS

(71) Applicant: International Business Machines Corporation, Armonk, NY (US)

(72) Inventors: Avery Francois, East Schodack, NY (US); Kenneth Douglas Klapproth, Travis, TX (US); Guy G. Tracy, Austin, TX (US); Matthias Klein, Poughkeepsie, NY (US); Gregory William Alexander, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 17/708,073

(22) Filed: Mar. 30, 2022

(65) Prior Publication Data

US 2023/0318979 A1      Oct. 5, 2023

(51) Int. Cl.
*H04L 47/10* (2022.01)
*H04L 45/122* (2022.01)

(52) U.S. Cl.
CPC ............ *H04L 47/13* (2013.01); *H04L 45/122* (2013.01)

(58) Field of Classification Search
CPC .............................. H04L 47/13; H04L 45/122
See application file for complete search history.

(56) References Cited

U.S. PATENT DOCUMENTS

| | | | |
|---|---|---|---|
| 6,253,292 B1 | 6/2001 | Jhang et al. | |
| 6,988,173 B2 | 1/2006 | Blake et al. | |
| 7,551,564 B2 | 6/2009 | Mattina | |
| 7,568,073 B2 | 7/2009 | Shen et al. | |
| 8,359,436 B2 | 1/2013 | Vash et al. | |
| 8,635,411 B2 | 1/2014 | Flanders et al. | |

(Continued)

OTHER PUBLICATIONS

Cao et al, "Snooping and Ordering Ring—An Efficient Cache Coherence Protocol for Ring Connected CMP," 15th International Conference on Parallel and Distributed Systems (2009): pp. 126-133.

(Continued)

*Primary Examiner* — Derrick W Ferris
*Assistant Examiner* — M Mostazir Rahman
(74) *Attorney, Agent, or Firm* — CANTOR COLBURN LLP; Edward Wixted

(57)      ABSTRACT

Embodiments include processing commands on multiprocessor chip having a plurality of nodes that are interconnected via a clockwise ring network and a counterclockwise ring network. Aspects include receiving a command for execution and based at least in part on a determination that the clockwise ring network and the counterclockwise ring network are both available for transmission, performing a bidirectional execution of the command. The bidirectional execution includes transmitting a first warning signal on the clockwise ring network and a second warning signal on the counterclockwise ring network, transmitting the command on the clockwise ring network a first number of clock cycles after the first warning signal, and transmitting the command on the counterclockwise ring network a second number of clock cycles after the second warning signal.

14 Claims, 16 Drawing Sheets

(56) References Cited

U.S. PATENT DOCUMENTS

2004/0221052 A1\* 11/2004 Ramasubramanian .....................
                                                    H04L 12/427
                                                          709/230
2006/0041715 A1\*  2/2006 Chrysos ............. G06F 15/8015
                                                          711/110
2006/0045120 A1\*  3/2006 Mattina ................... H04L 47/13
                                                          370/460

OTHER PUBLICATIONS

Marty et al., "Coherence Ordering for Ring-based Chip Multipro-
cessors," 39th Annual IEEE/ACM International Symposium on
Microarchitecture (2006): pp. 309-320.
Strauss et al., "Uncorq: Unconstrained Snoop Request Delivery in
Embedded-Ring Multiprocessors," 40th Annual IEEE/ACM Inter-
national Symposium on Microarchitecture (2007): pp. 327-342.

\* cited by examiner

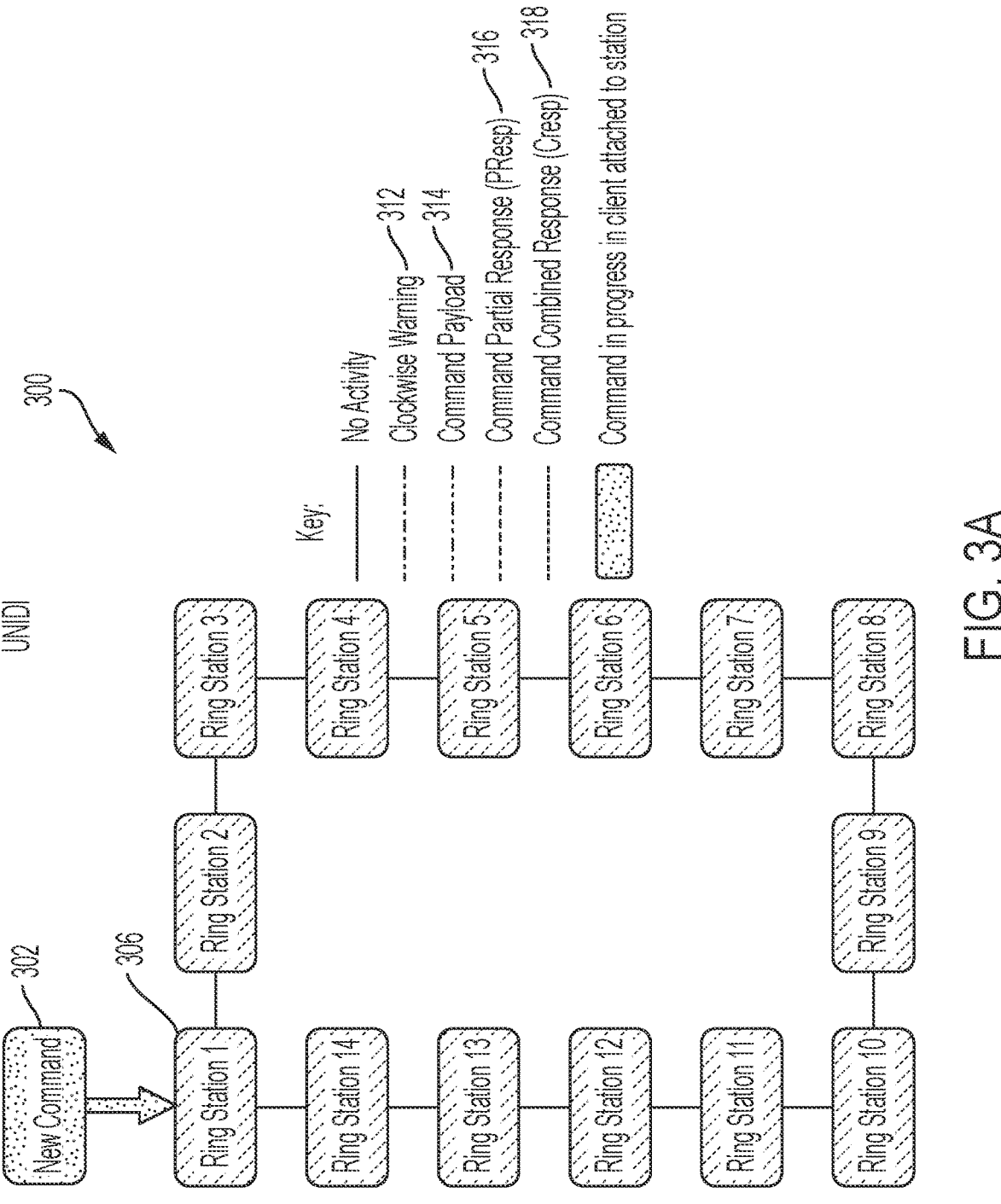

300

UNIDI

New Command 302

306

Ring Station 1
Ring Station 2
Ring Station 3
Ring Station 4
Ring Station 5
Ring Station 6
Ring Station 7
Ring Station 8
Ring Station 9
Ring Station 10
Ring Station 11
Ring Station 12
Ring Station 13
Ring Station 14

Key:

No Activity
Clockwise Warning — 312
Command Payload — 314
Command Partial Response (PResp) — 316
Command Combined Response (Cresp) — 318

Command in progress in client attached to station

FIG. 3A

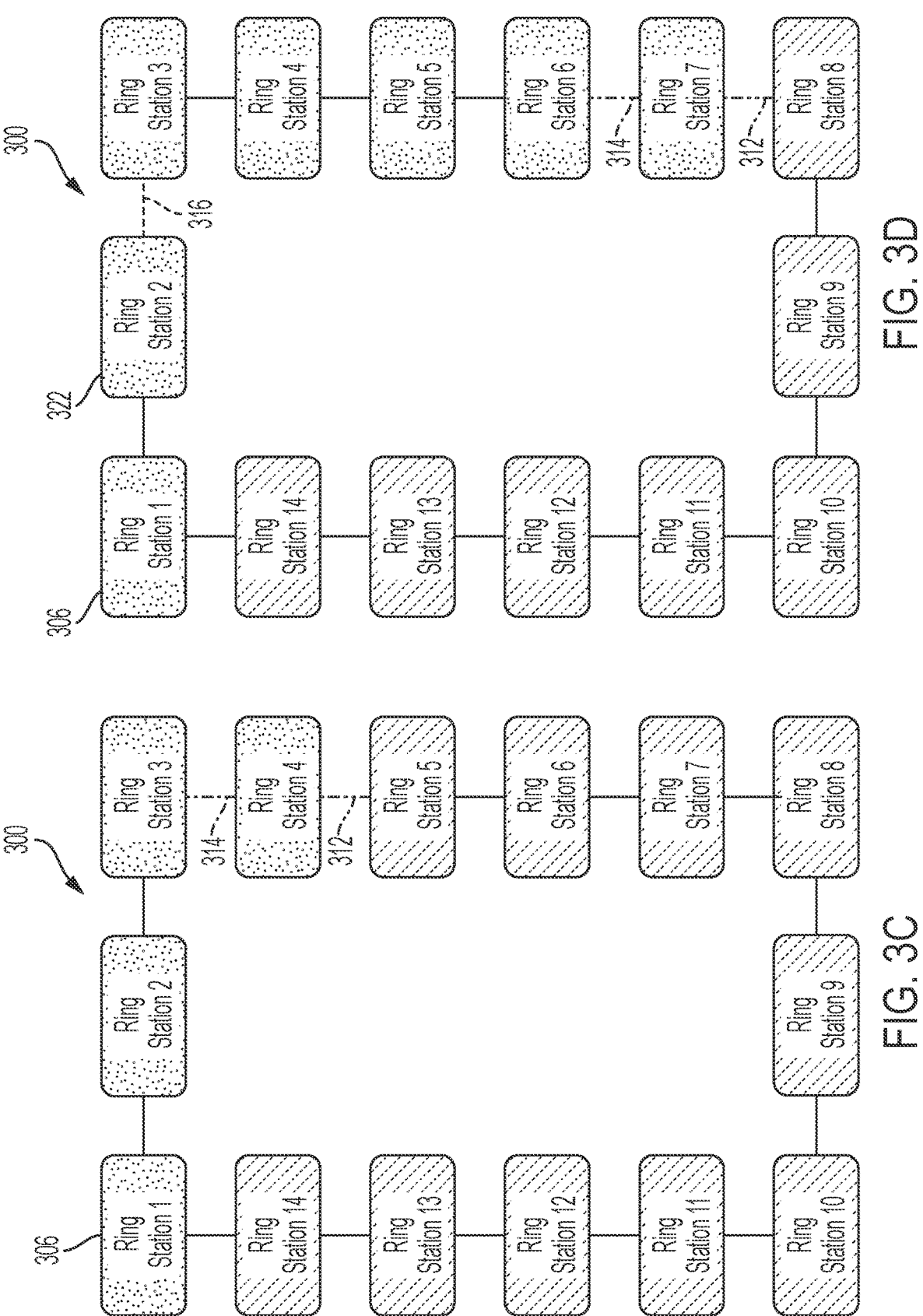

BIDIRECTIONAL RING-BASED INTERCONNECTION NETWORKS FOR MULTIPROCESSORS

BACKGROUND

The present invention generally relates to computer technology, and more specifically, to a bidirectional ring-based interconnection network for multiprocessors.

Modern multiprocessors include a plurality of nodes, which include processing cores and caches, that are connected using an interconnection network to convey commands and responses between the plurality of nodes. Interconnection networks can be categorized according to their topology, routing strategy, and switching technique. The network topology, the way in which the components are interconnected, is a major determining factor in the overhead cost of message passing. Accordingly, network designs attempt to minimize both the number of messages required and the distances over which they must travel.

SUMMARY

Embodiments of the present invention are directed to processing a command on multiprocessor chip having a plurality of nodes that are interconnected via a clockwise ring network and a counterclockwise ring network. A non-limiting example of the computer-implemented method includes receiving, by a first ring station associated with a first node of the plurality of nodes, the command for execution. The method also includes performing a bidirectional execution of the command based at least in part on a determination that the clockwise ring network and the counterclockwise ring network are both available for transmission. The bidirectional execution of the command includes transmitting a first warning signal on the clockwise ring network indicating that the command will be transmitted on the clockwise ring network a first number of clock cycles after the first warning signal and transmitting a second warning signal on the counterclockwise ring network indicating that the command will be transmitted on the counterclockwise ring network a second number of clock cycles after the second warning signal, wherein the first warning signal and the second warning signal are transmitted during a same clock cycle. The bidirectional execution of the command also includes transmitting, during the first number of clock cycles after the first warning signal, the command on the clockwise ring network and transmitting, during the second number of clock cycles after the second warning signal, the command on the counterclockwise ring network, wherein the second number is different from the first number.

Embodiments of the present invention are directed to a multiprocessor chip having a plurality of nodes and a plurality of ring stations, which are each associated with one of the plurality of node, that are interconnected via a clockwise ring network and a counterclockwise ring network. A first ring station associated with a first node of the plurality of nodes is configured to receive a command for execution and perform a bidirectional execution of the command based at least in part on a determination that the clockwise ring network and the counterclockwise ring network are both available for transmission. The bidirectional execution of the command includes transmitting a first warning signal on the clockwise ring network indicating that the command will be transmitted on the clockwise ring network a first number of clock cycles after the first warning signal and transmitting a second warning signal on the counterclockwise ring network indicating that the command will be transmitted on the counterclockwise ring network a second number of clock cycles after the second warning signal, wherein the first warning signal and the second warning signal are transmitted during a same clock cycle. The bidirectional execution of the command also includes transmitting, during the first number of clock cycles after the first warning signal, the command on the clockwise ring network and transmitting, during the second number of clock cycles after the second warning signal, the command on the counterclockwise ring network, wherein the second number is different from the first number.

Embodiments of the present invention are directed to a system having a memory having computer readable instructions and a multiprocessor chip for executing the computer readable instructions. The multiprocessor chip including a plurality of nodes and a plurality of ring stations, which are each associated with one of the plurality of node, that are interconnected via a clockwise ring network and a counterclockwise ring network. A first ring station associated with a first node of the plurality of nodes is configured to receive a command for execution and perform a bidirectional execution of the command based at least in part on a determination that the clockwise ring network and the counterclockwise ring network are both available for transmission. The bidirectional execution of the command includes transmitting a first warning signal on the clockwise ring network indicating that the command will be transmitted on the clockwise ring network a first number of clock cycles after the first warning signal and transmitting a second warning signal on the counterclockwise ring network indicating that the command will be transmitted on the counterclockwise ring network a second number of clock cycles after the second warning signal, wherein the first warning signal and the second warning signal are transmitted during a same clock cycle. The bidirectional execution of the command also includes transmitting, during the first number of clock cycles after the first warning signal, the command on the clockwise ring network and transmitting, during the second number of clock cycles after the second warning signal, the command on the counterclockwise ring network, wherein the second number is different from the first number.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A, 3B, 3C, 3D, 3E, 3F, 3G, and 3H are block diagrams illustrating a flow of command and response signals through a unidirectional ring-based network in accordance with one or more embodiments of the present invention;

DETAILED DESCRIPTION

One or more embodiments of the invention are configured to process commands on a multiprocessor chip having a plurality of nodes that are interconnected via bidirectional networks, i.e., a clockwise ring network and a counterclockwise ring network. In exemplary embodiments, a determination of whether to perform a bidirectional execution or unidirectional execution of a command is based on a type of the command and upon congestion of the bidirectional networks. In exemplary embodiments, the bidirectional network is configured such that a unidirectional ring command is able to be performed around a ring concurrently with a bidirectional ring command going both ways around a ring simultaneously. In order to support concurrent execution of both unidirectional and bidirectional commands, the nodes of the bidirectional network are configured to time their responses for both those unidirectional and bidirectional commands such that every ring observer is aware of a combined cache result in a fixed time to the original broadcast of the command.

Figure 1:
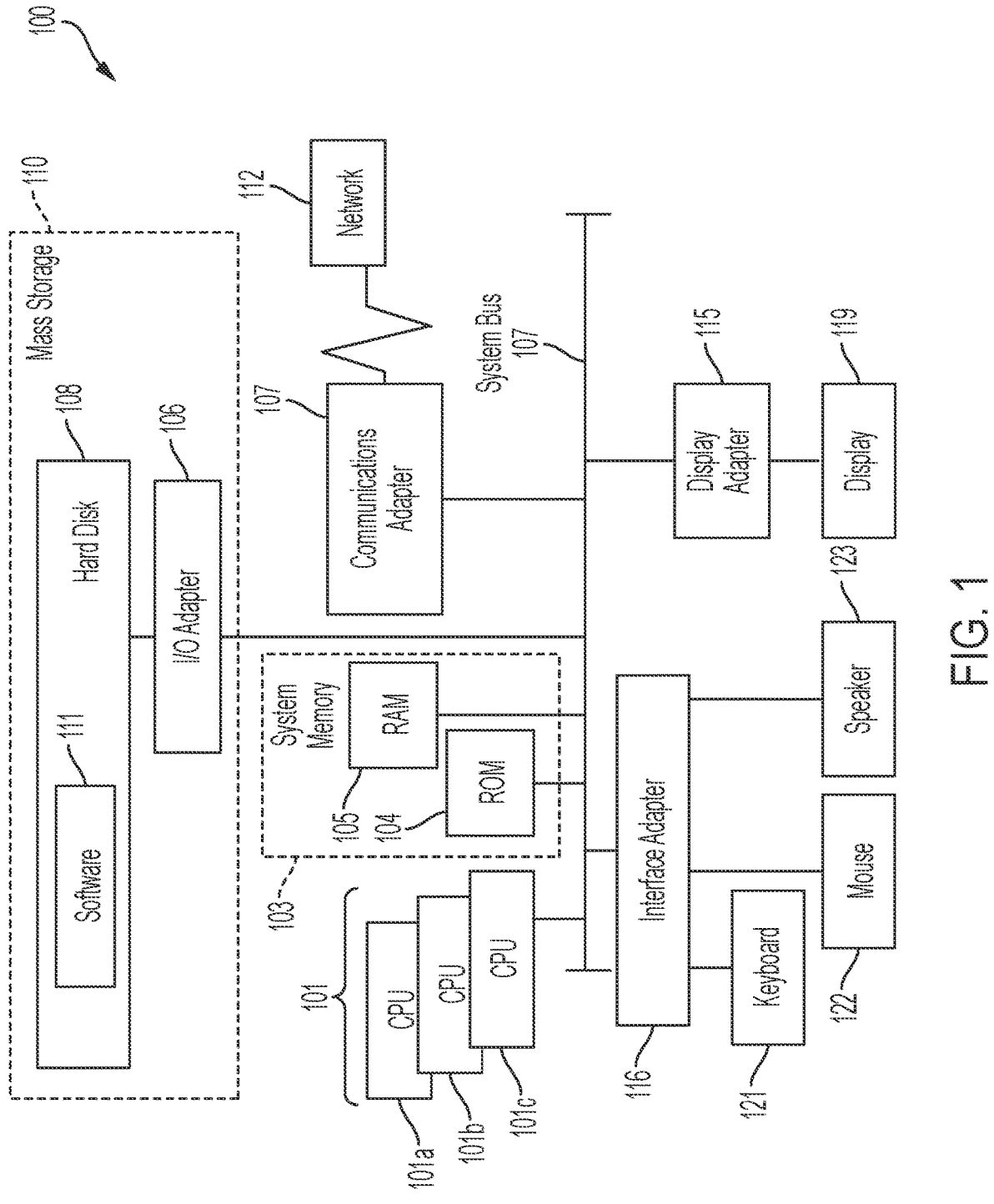
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
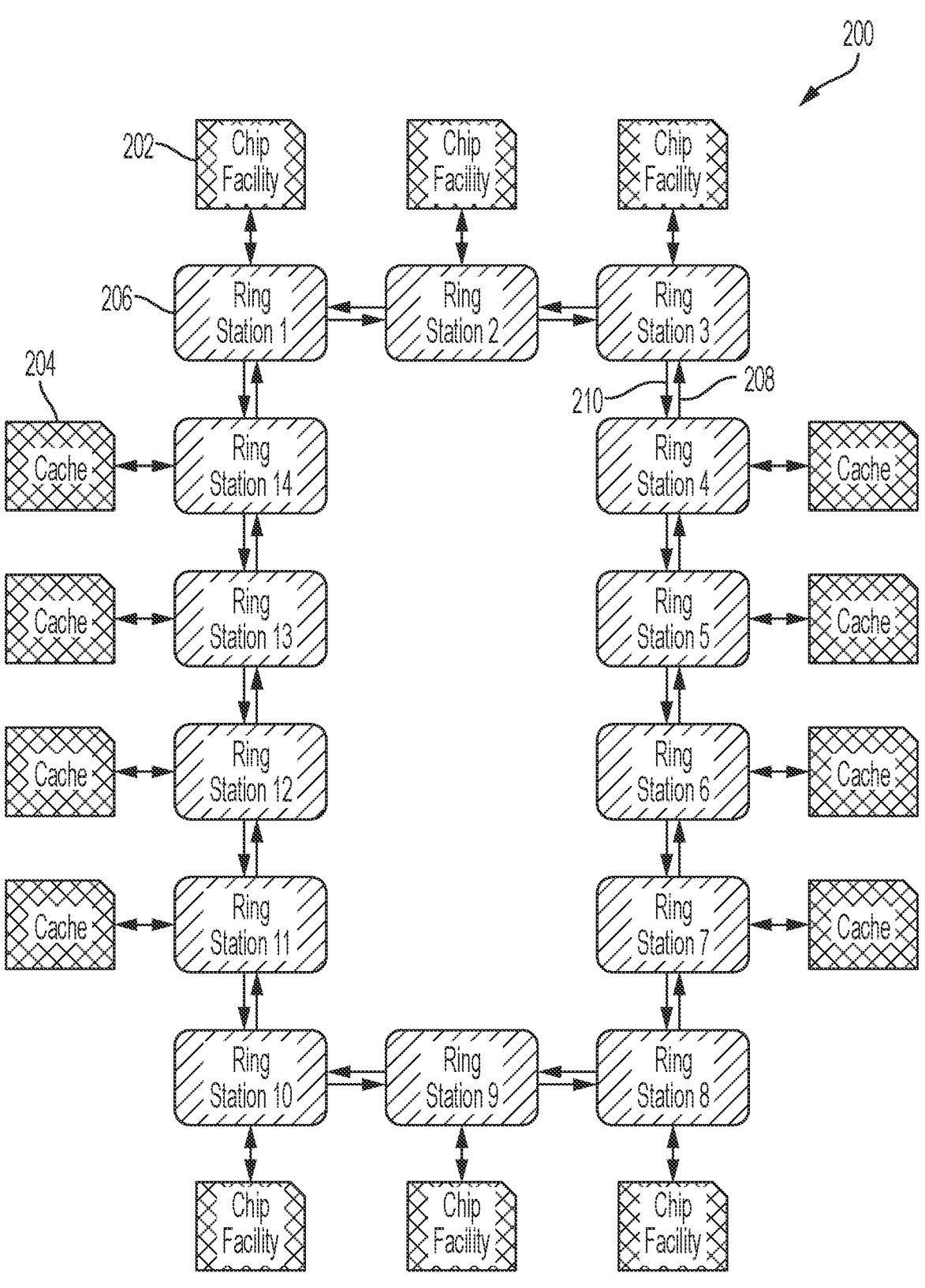
FIG. 2A is a block diagram of a multiprocessor having bidirectional ring-based networks in accordance with one or more embodiments of the present invention.
Figure 2B:
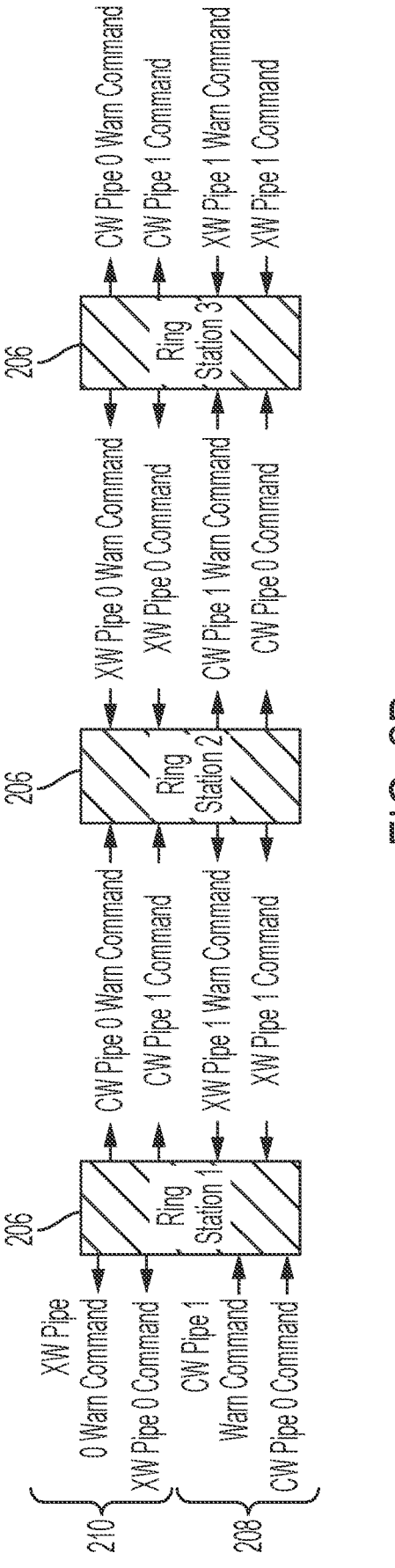
FIG. 2B is a block diagram illustrating a portion of the bidirectional ring-based networks in accordance with one or more embodiments of the present invention.

FIGS. 2A and 2B are block diagrams of a multiprocessor 200 in accordance with one or more embodiments of the present invention. The multiprocessor 200 shown in FIGS. 2A and 2B may be used in and/or integrated into computer system 100, shown in FIG. 1. As illustrated, the multiprocessor 200 includes a plurality of ring stations 206 that are each associated with a node in the multiprocessor 200. The nodes include chip facilities, or processing cores, 202 and shared memories, or caches 204. Each of the ring stations 206 is connected to the two adjacent ring stations 206 via one of a clockwise ring network 210 and a counterclockwise ring network 208. Each ring station 206 is configured to send and receive messages to and from each adjacent ring station 206.

In exemplary embodiments, each ring station 206 is configured to be able to place a command, such as a snoop request, onto one or more of the clockwise ring network 210 and the counterclockwise ring network 208. In exemplary embodiments, once a snoop request has been entered into a ring network it will not be halted as it flows around the ring network. Accordingly, in order to determine when commands can and can't be placed onto the ring network during a particular cycle, a warning signal is transmitted on the ring by a ring station in advance of primary ring traffic. The warning signal is an indication that is transmitted ahead of the primary ring traffic that is used by ring stations to identify what will be transmitted on the ring network in future cycles. The time that the warning signal is received time by a ring station can be used as the singular arbitration point determining when to initiate a command onto the ring network. In exemplary embodiments, all future messages relating to a command are reserved in time behind the warning signal.

As best shown by FIG. 2B, the clockwise ring network 210 and counterclockwise ring network 208 connecting each ring station 206 can be partitioned further based upon an address bit delimitation, referred to as a "pipe", in order to increase throughput. In one embodiment, ring traffic in each direction time multiplexes these pipes and alternates between them in each direction. The pipes in each ring direction are offset such that no ring station 206 will receive a command on the same pipe in both directions to avoid queueing to the ring station 206. As described in more detail below, in some embodiments, the multiprocessor 200 includes an even number of ring stations to avoid queueing to the ring station 206 and collisions, where two commands are delivered to a single ring station during a single cycle for a same pipe.

Figure 3B:
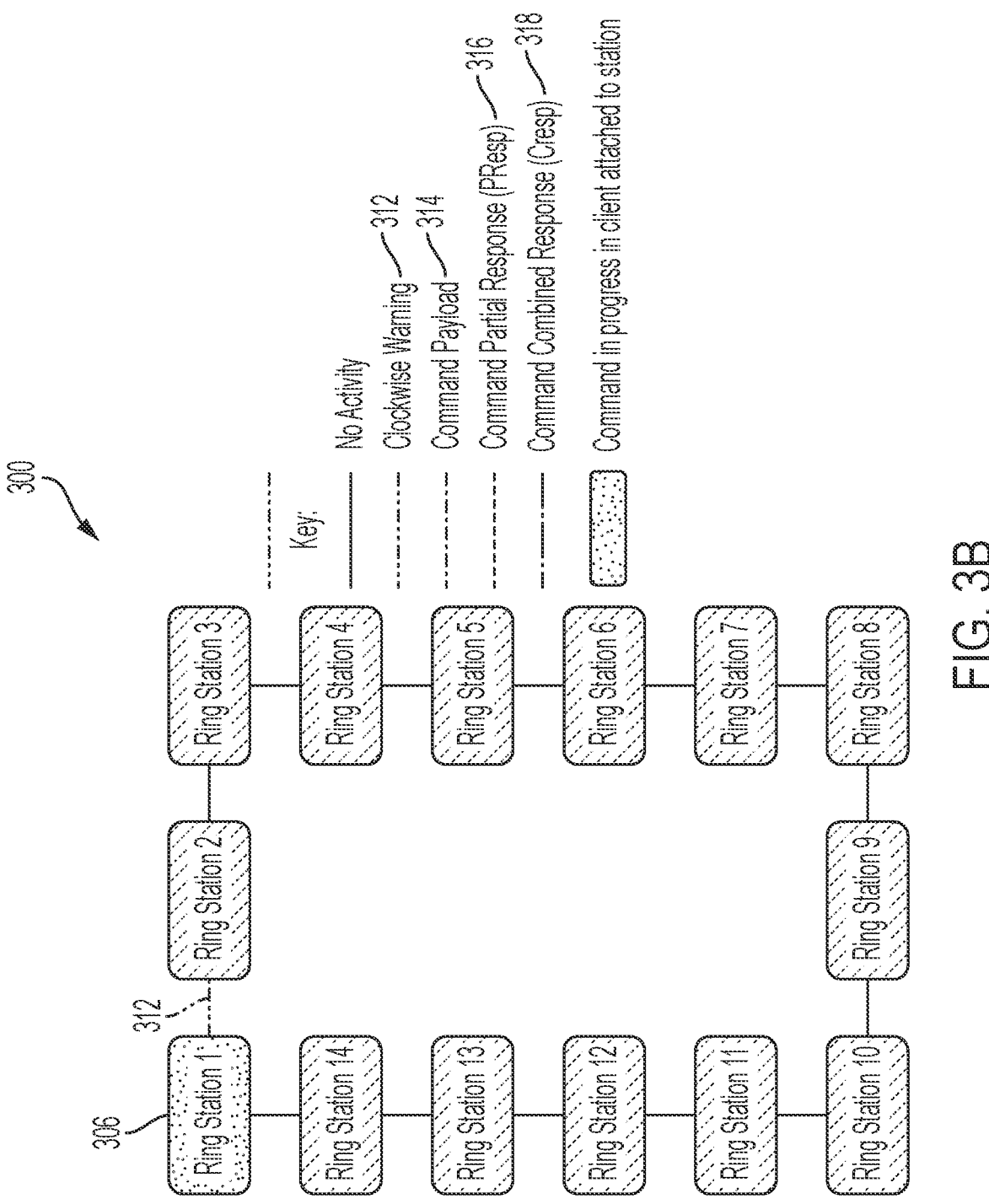

Referring now to FIGS. 3A, 3B, 3C, 3D, 3F, 3G, and 3H block diagrams illustrating a flow of command and response signals through a unidirectional ring-based network in accordance with one or more embodiments of the present invention are shown. As shown in FIG. 3A, a first node 302 of a multiprocessor associated with a first ring station 306 initiates a request for the first ring station 306 to place a command onto a unidirectional ring-based network 300. Next, as shown in FIG. 3B, once the first ring station 306 determines that the unidirectional ring-based network 300 is available for transmission of the command, the first ring station 306 transmits a warning signal 312 to the adjacent ring station. In exemplary embodiments, the determination that the unidirectional ring-based network 300 is available for transmission of the command is based on data extracted by the first ring station 306 from previously received warning signals indicating the traffic on the unidirectional ring-based network 300. In exemplary embodiments, one cycle after the first ring station 306 transmits the warning signal 312, the first ring station 306 transmits a command signal 314 on the unidirectional ring-based network 300.

Figures 3E, 3F:
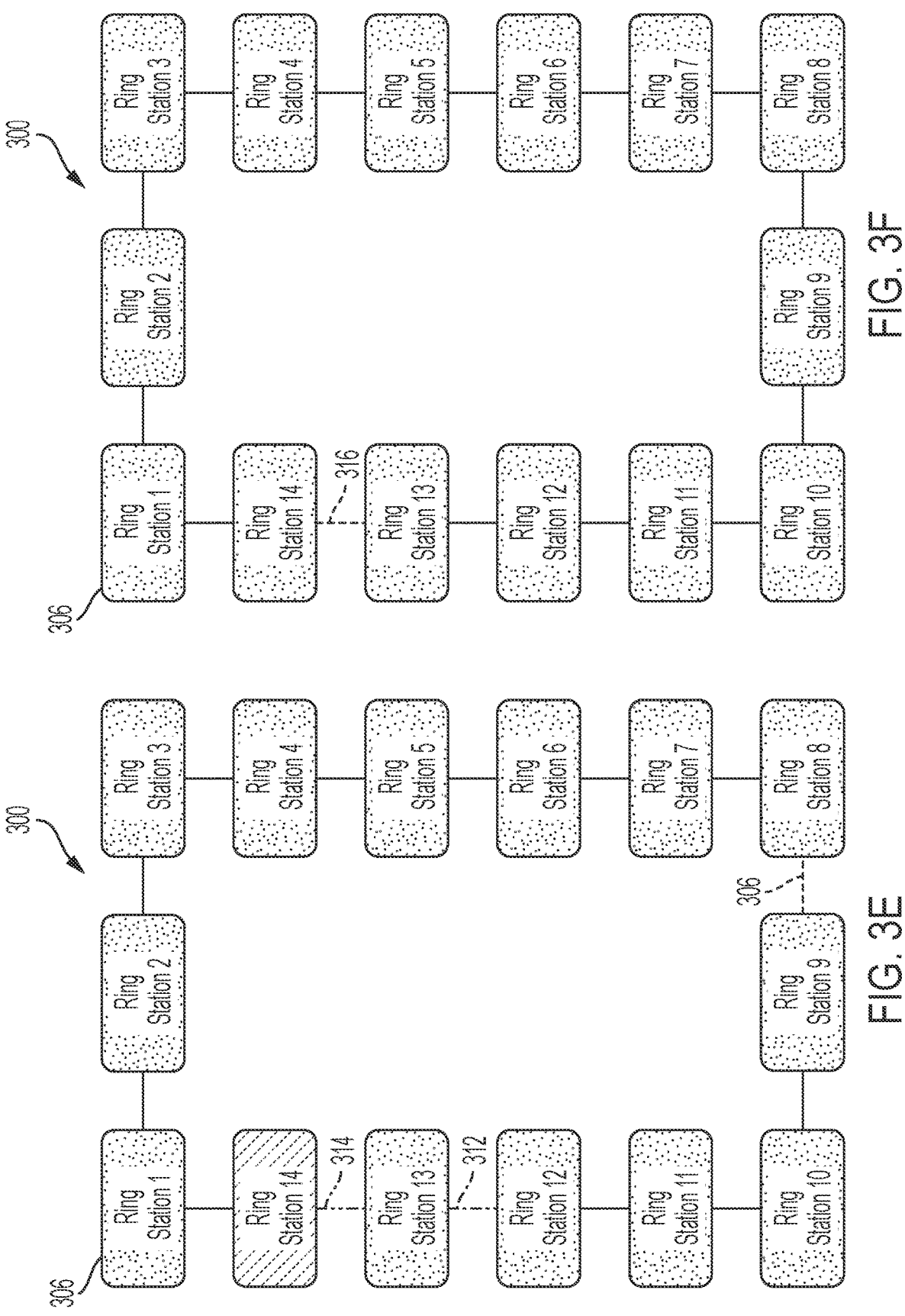

As shown in FIG. 3C, the warning signal 312 and the command signal 314 propagate around the unidirectional ring-based network 300 with each ring station transmitting the warning signal 312 and the command signal 314 to the next ring station. After receiving the command signal, each ring station will process the command and determine its response to the command. As shown in FIG. 3D, the second ring station 322 transmits a partial response signal 316 to the command to the next ring station a number of cycles after the command signal 314. In exemplary embodiments, each ring station is configured to receive a partial response signal 316 from an adjacent ring station, add its response to the partial response signal and transmit an accumulated partial response signal 316 to the next ring station. As shown in FIGS. 3D and 3E, the partial response signal 316 propagates around the unidirectional ring-based network 300 a number of cycles behind the command signal 314.

Figures 3G, 3H:
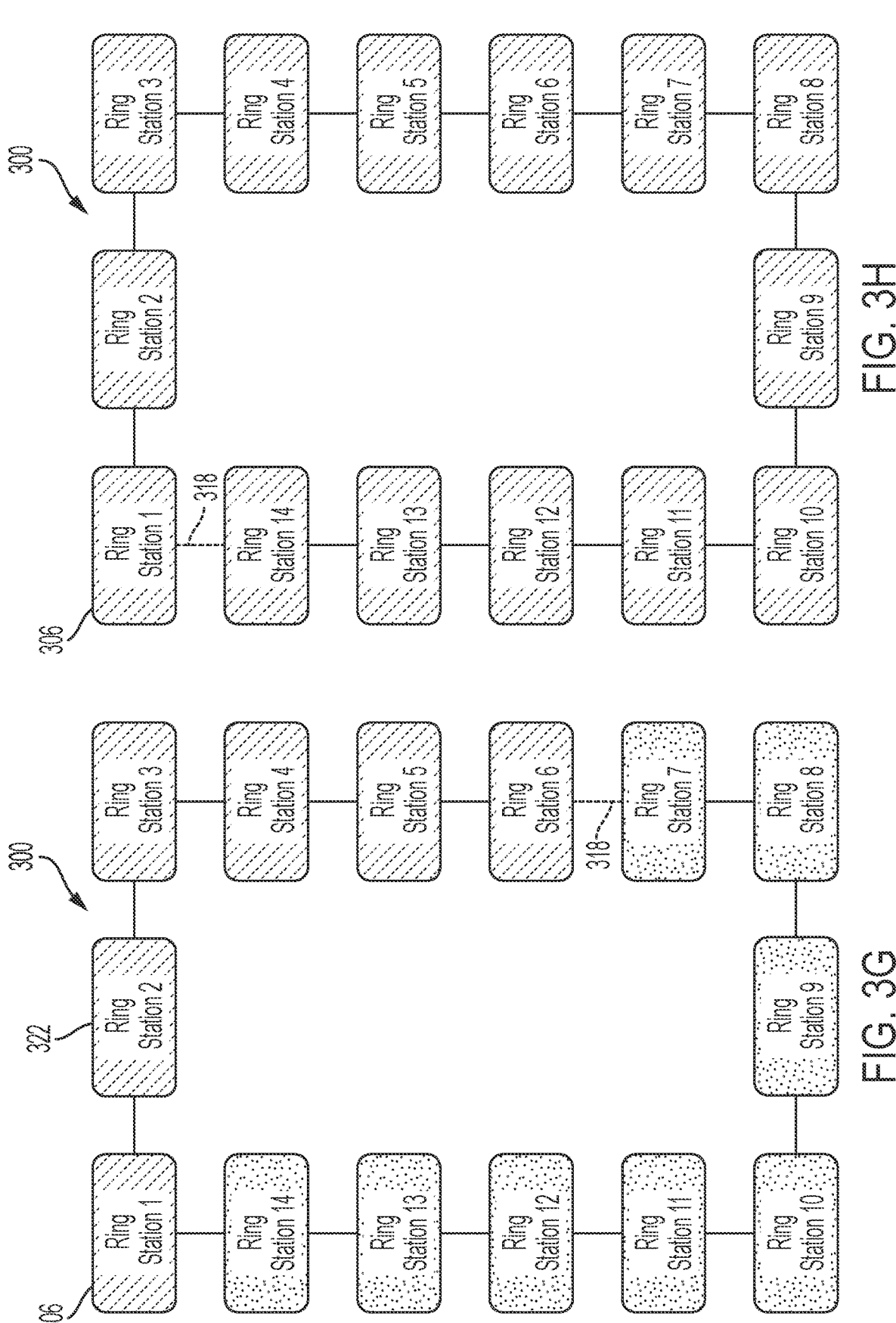

Next, as shown in FIG. 3F, the warning signal 312 and the command signal 314 terminate the traversal of the unidirectional ring-based network 300 upon reaching the first ring station 306 while the partial response signal 316 continues to propagate around the unidirectional ring-based network 300. After the partial response signal 316 reaches the first ring station 306, the first ring station 306 transmits a complete response signal 318 to the second ring station 322. As shown in FIGS. 3G and 3H, the complete response signal 318 traverses the unidirectional ring-based network 300 until it reaches the first ring station 306. When a ring station transmits or terminates the complete response signal 318, the ring station has completed its execution of the command.

Figure 4A:
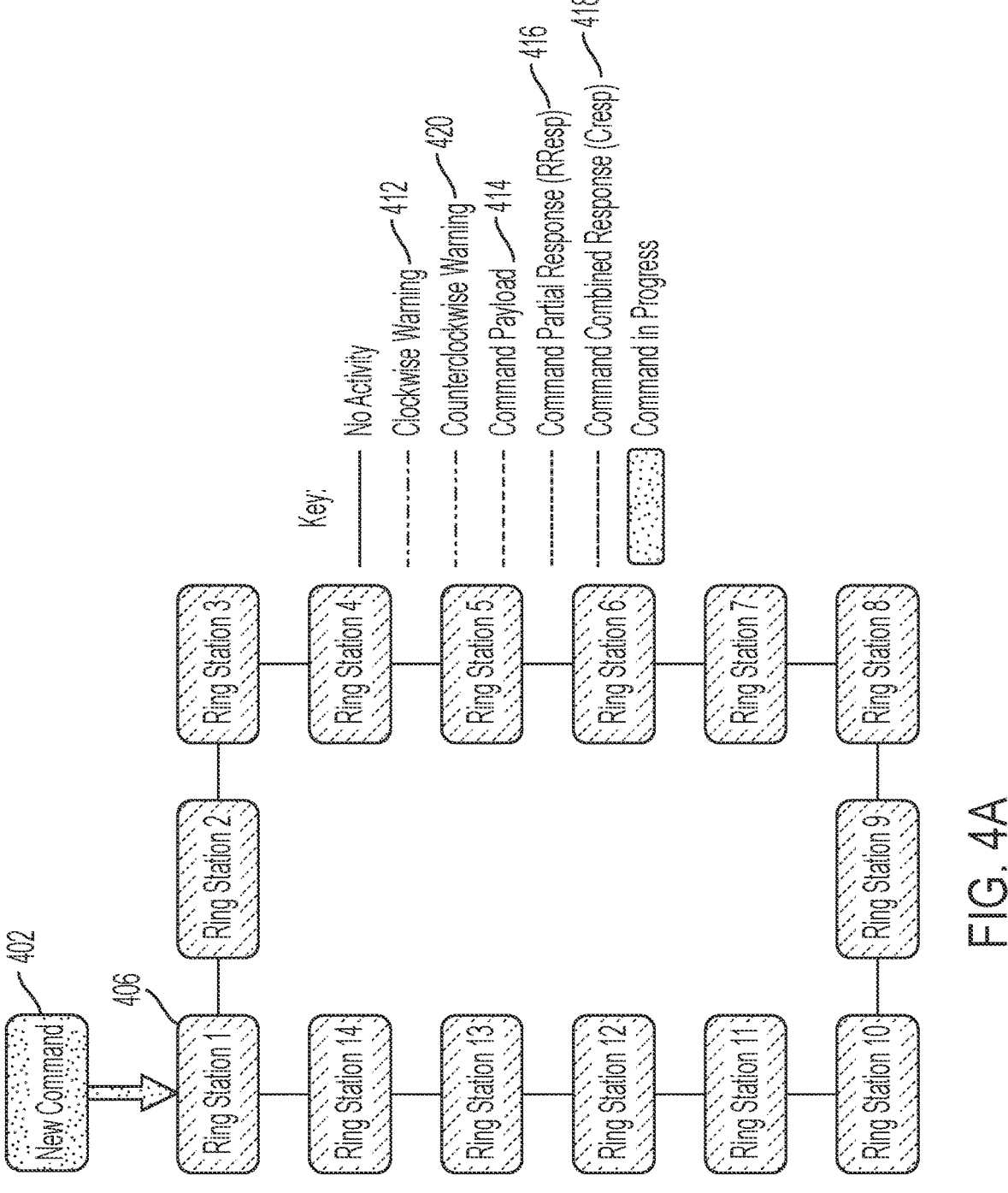
FIGS. 4A, 4B, 4C, 4D, 4E, 4F, 4G, 4H, 4I, and 4J are block diagrams illustrating a flow command and response signals through bidirectional ring-based networks in accordance with one or more embodiments of the present invention.
Figures 4B, 4C:
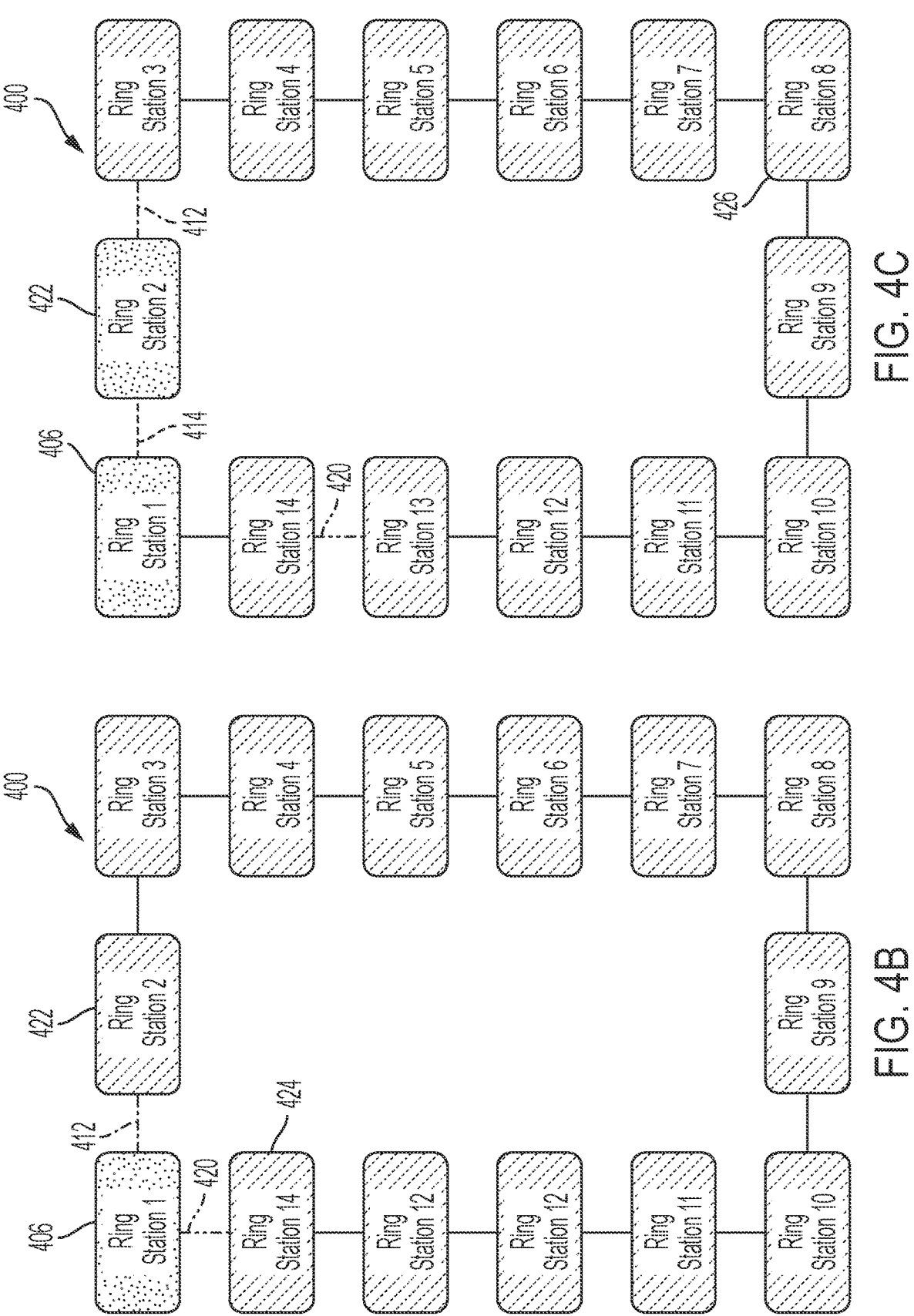

Referring now to FIGS. 4A, 4B, 4C, 4D, 4F, 4G, 4H, 4I, and 4J block diagrams illustrating a flow of command and response signals through bidirectional ring-based networks in accordance with one or more embodiments of the present invention are shown. As shown in FIG. 4A, a first node 402 of a multiprocessor associated with a first ring station 406 initiates a request for the first ring station 406 to place a command onto a bidirectional ring-based network 400. Next, as shown in FIG. 4B, once the first ring station 406 determines that the bidirectional ring-based network 400 is available for transmission of the command, the first ring station 406 transmits a clockwise warning signal, also referred to as a first warning signal, 412 to ring station 422 and a counterclockwise warning signal, also referred to as a second warning signal, 420 to ring station 424. The clockwise warning signal 412 and the counterclockwise warning signal 420 are transmitted by the first ring station 406 during the same clock cycle.

In exemplary embodiments, the determination that the bidirectional ring-based network 400 is available for transmission of the command is based on data extracted by the first ring station 406 from previously received warning signals indicating the traffic on the bidirectional ring-based network 400. In exemplary embodiments, the availability of the bidirectional ring-based network 400 is determined based on previously executed unidirectional and bidirectional commands being executed on the bidirectional ring-based network 400.

Next, as shown in FIG. 4C, in the cycle after the clockwise warning signal 412 is transmitted, the first ring station 406 transmits a command signal 414 to the ring station 422. The clockwise warning signal 412 and the command signal 414 propagate around the bidirectional ring-based network 400 in the clockwise direction with each ring station transmitting the clockwise warning signal 412 and the command signal 414 to the next ring station until the diagonal ring station 426 is reached. The diagonal ring station 426 is the ring station that is the same number of hops away from the first ring station 406 in both the clockwise and counterclockwise directions.

Figures 4D, 4E:
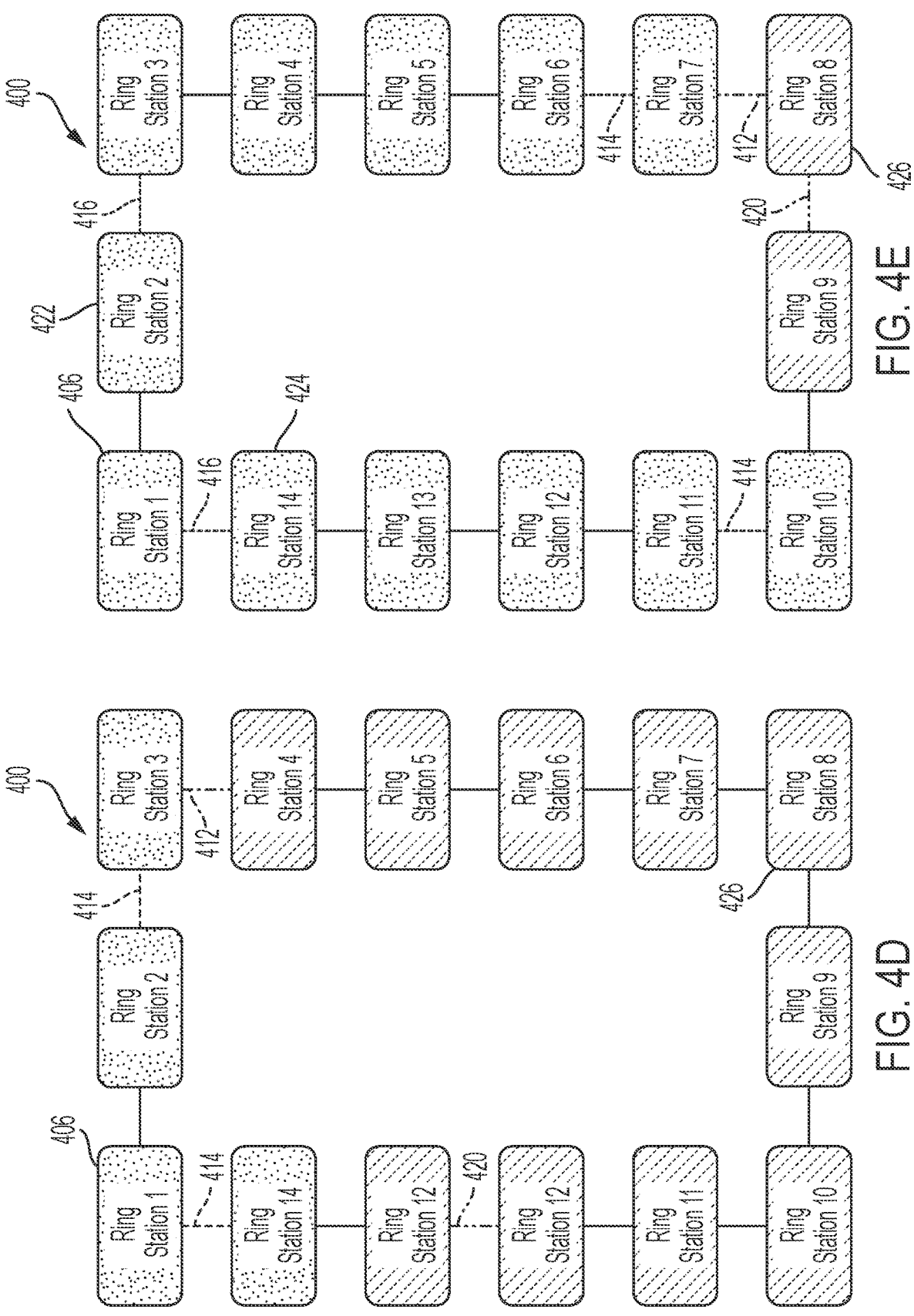

Next, as shown in FIG. 4D, two cycles after the counterclockwise warning signal 420 is transmitted, the first ring station 406 transmits a command signal 414 to the ring station 424. The counterclockwise warning signal 420 and the command signal 414 propagate around the bidirectional ring-based network 400 in the counterclockwise direction with each ring station transmitting the counterclockwise warning signal 420 and the command signal 414 to the next ring station until the diagonal ring station 426 is reached. Upon receiving the command signal 414, each ring station will process the command and determine its response to the command.

Figures 4F, 4G:
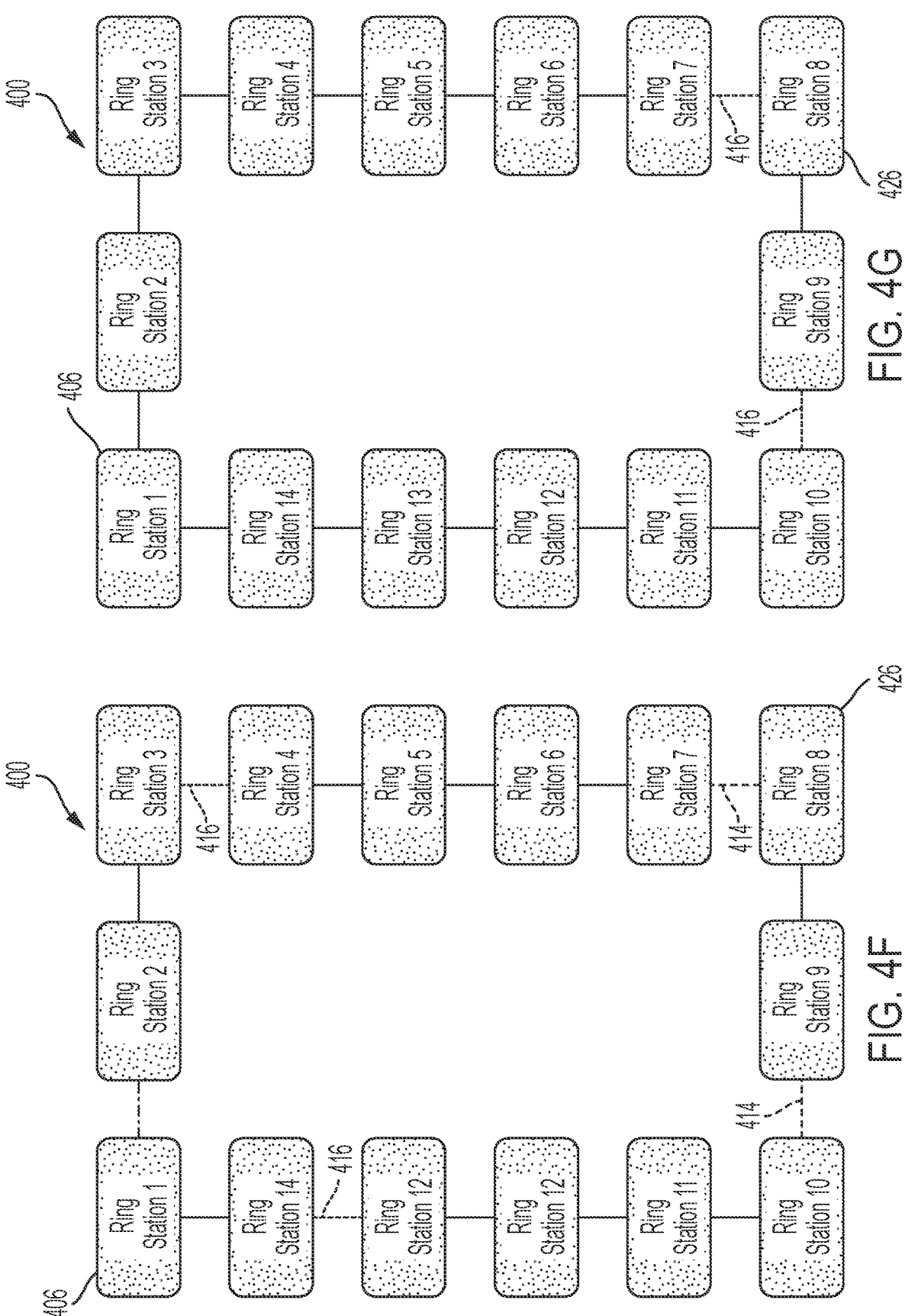

As shown in FIGS. 4E and 4F, the ring stations transmit a partial response signal 416 to the command signal 414 to the next ring station, in their respective direction, a number of cycles after the command signal 414. In exemplary embodiments, each ring station is configured to receive a partial response signal 416 from an adjacent ring station, add its response to the partial response signal and transmit an accumulated partial response signal 416 to the next ring station until the partial response signals 416 reach the diagonal ring station as shown in FIG. 4G.

Figures 4H, 4I:
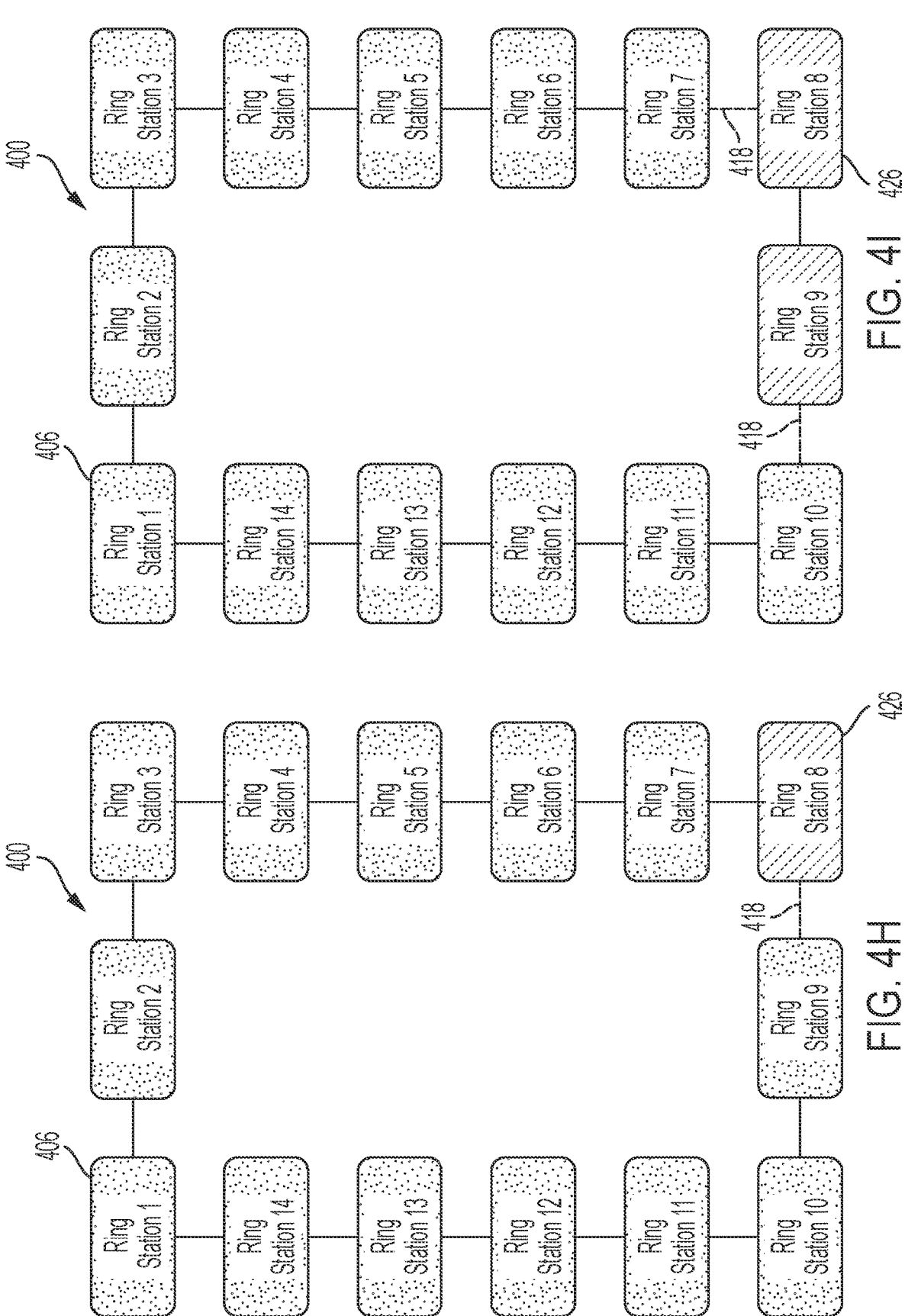
Figure 4J:
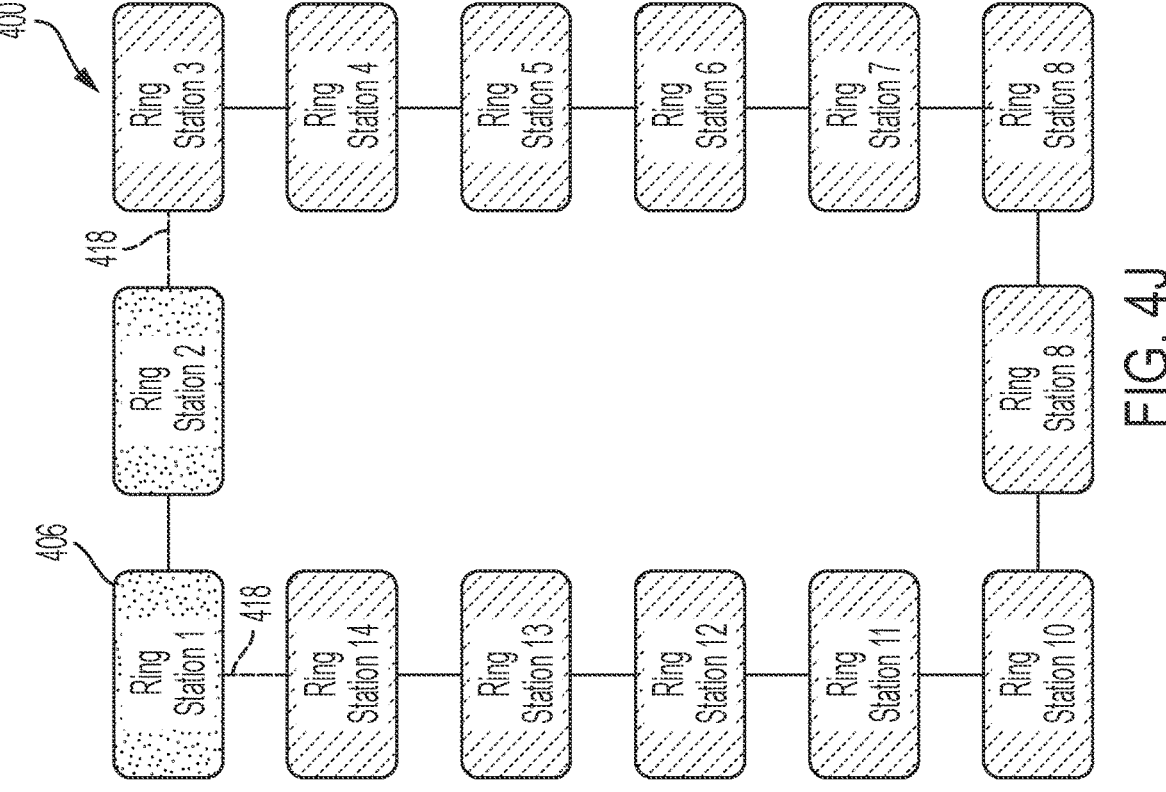

As best shown in FIG. 4H, the diagonal ring station 426 is configured to combine both partial response signals 416 and to create a complete response signal 418 that is transmitted in the clockwise direction. In the cycle after the diagonal ring station 426 transmits the complete response signal 418 in the clockwise direction, the diagonal ring station 426 transmits the complete response signal 418 in the counterclockwise direction, as shown in FIG. 4I. The complete response signals 418 propagate around the bidirectional ring-based network 400 in both the clockwise and counterclockwise direction until the first ring station 406 is reached. When a ring station transmits or terminates the complete response signal 418, the ring station has completed its execution of the command.

In exemplary embodiments, executing a command using a unidirectional network will require at least twice the number of clock cycles are there are nodes in the ring-based network. In contrast, executing a similar command in a bidirectional network will require approximately the number of clock cycles are there are nodes in the ring-based network, i.e., execution of commands via a bidirectional network are almost twice as fast as using a unidirectional network.

In exemplary embodiments, because bidirectional execution of commands taking half the time to complete the completed response signal that follows the command signal will collide exactly when a bidirectional command starts on the cycle a unidirectional command ends on the starting station, which is prevented using a bidirectional execution lock. Each ring station is configured to record the time a unidirectional or bidirectional command passes through the setting of a shift register.

Since the time a unidirectional command requires the use of the combined response bus is fixed, each ring station calculates when the combined response bus would be needed in the future for a particular direction by a bidirectional command and blocks the insertion onto the ring network of the new command during cycles the ring station knows the combined responses for a unidirectional command will collide in the future.

In exemplary embodiments, ring stations are configured to be able to initiate both bidirectional and unidirectional execution of commands using the bidirectional ring network. In one embodiment, the determination of whether to use a bidirectional or a unidirectional execution of a particular command is based on a type of command. In one embodiment, some types of commands are always executed unidirectionally. In another embodiment, the determination of whether to use a bidirectional or a unidirectional execution of a particular command is based on a traffic level, or congestion, of the bidirectional ring network. In one embodiment, a configurable threshold congestion level is used to determine whether to use a bidirectional or a unidirectional execution of a particular command. For example, when the congestion on the bidirectional ring network is above a threshold level, commands will be executed in a unidirectional manner and when the congestion on the bidirectional ring network is below the threshold level, commands will be executed in a bidirectional manner.

Figure 5:
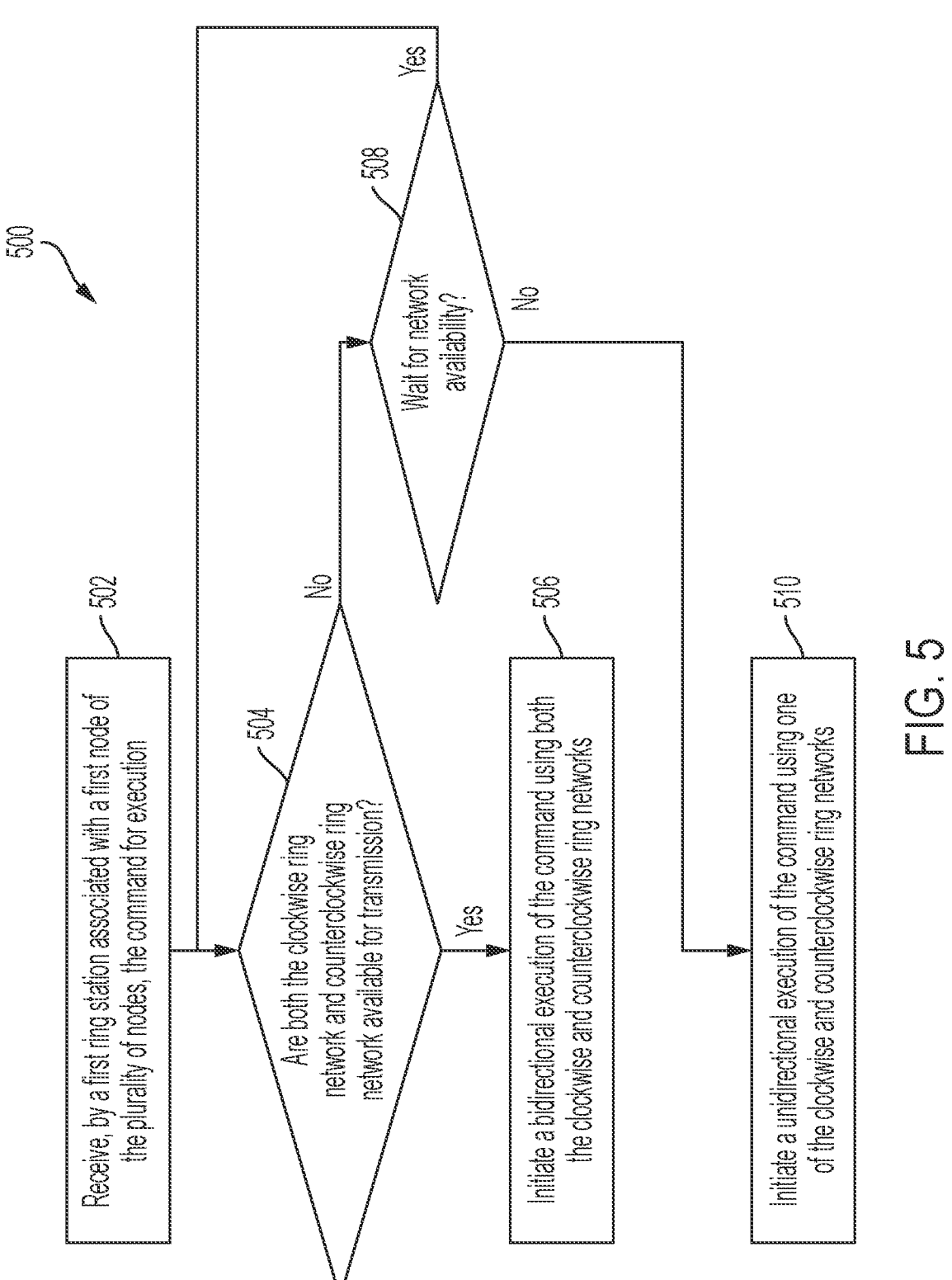
FIG. 5 is a flowchart of a method for processing a command on multiprocessor chip having a plurality of nodes that are interconnected via a clockwise ring network and a counterclockwise ring network in accordance with one or more embodiments of the present invention.

Referring now to FIG. 5 a flowchart of a method 500 for processing a command on multiprocessor chip having a plurality of nodes that are interconnected via a clockwise ring network and a counterclockwise ring network in accordance with one or more embodiments of the present invention is shown. The method 500 includes receiving, by a first ring station associated with a first node of the plurality of nodes, the command for execution, as shown at block 502. Next, as shown at decision block 504, the method 500 includes determining if both the clockwise ring network and counterclockwise ring network are available for transmission. If both the clockwise ring network and counterclockwise ring network are available for transmission, the method 500 proceeds to block 506 and initiates a bidirectional execution of the command using both the clockwise and counterclockwise ring networks. Otherwise, the method 500 proceeds to decision block 508 and determines whether to wait for both the clockwise and counterclockwise ring networks to become available. Based on a determination to wait for both the clockwise and counterclockwise ring networks to become available, the method returns to decision block 504. Otherwise, the method 500 proceeds to block 510 and initiates a unidirectional execution of the command using one of the clockwise and counterclockwise ring networks. In exemplary embodiments, the determination of whether to wait for both the clockwise and counterclockwise ring networks to become available includes waiting a configurable number of cycles for both the clockwise and counterclockwise ring networks to become available.

Figure 6:
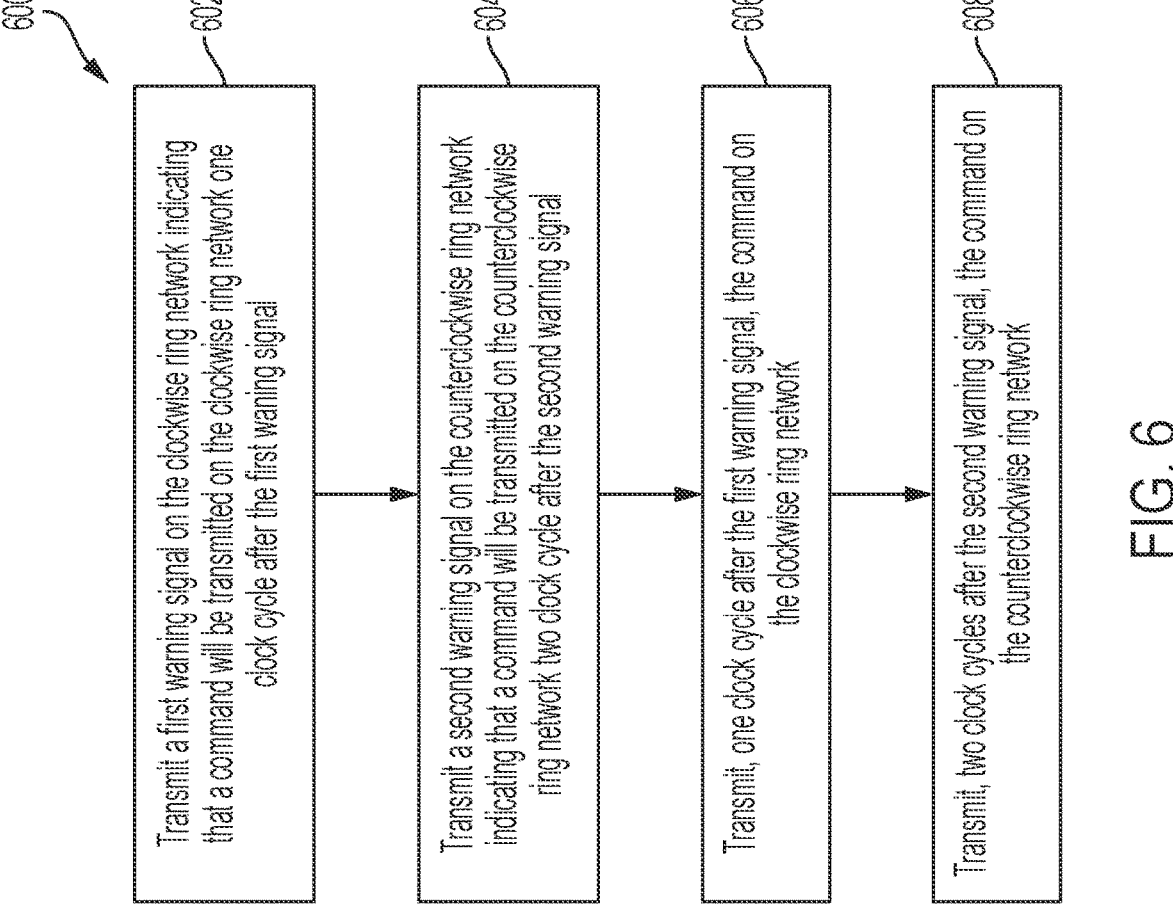
FIG. 6 is a flowchart of a method for performing a bidirectional execution of a command using both a clockwise ring network and counterclockwise ring network in accordance with one or more embodiments of the present invention.

Referring now to FIG. 6 a flowchart of a method 600 for performing a bidirectional execution of a command using both a clockwise ring network and counterclockwise ring network in accordance with one or more embodiments of the present invention is shown. The method 600 includes transmitting a first warning signal on the clockwise ring network indicating that a command will be transmitted on the clockwise ring network one clock cycle after the first warning signal, as shown at block 602. Next, as shown at block 604, the method 600 includes transmitting a second warning signal on the counterclockwise ring network indicating that a command will be transmitted on the counterclockwise ring network two clock cycles after the second warning signal. The method 600 also includes transmitting, one clock cycle after the first warning signal, the command on the clockwise ring network, as shown at block 606. The method 600 further includes transmitting, two clock cycles after the second warning signal, the command on the counterclockwise ring network, as shown at block 608.

In exemplary embodiments, technical effects and benefits of the methods, systems, and computer program products for processing a command on multiprocessor chip having a plurality of nodes that are interconnected via a clockwise ring network and a counterclockwise ring network include reducing a time required to perform the command. In exemplary embodiments, executing a command using a bidirectional network requires approximately half the number of clock cycles that it would take to execute the same command using a unidirectional network. This savings in time allows the associated cache directory lookup to happen sooner, speeding up the data return path and therefore increasing cache performance. One advantage of having simultaneous bidirectional and unidirectional ring traffic is that it allows for faster initiation of commands during a period of increased traffic where either or both directions are frequently busy with other traffic, which will reduce the overall latency experienced by a single ring station trying to initiate a request onto the ring network.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of processing a command on multiprocessor chip having a plurality of nodes that are interconnected via a clockwise ring network and a counterclockwise ring network, the method comprising:

receiving, by a first ring station associated with a first node of the plurality of nodes, the command for execution;

based at least in part on a determination that the clockwise ring network and the counterclockwise ring network are both available for transmission, performing a bidirectional execution of the command by:

transmitting a first warning signal on the clockwise ring network indicating that the command will be transmitted on the clockwise ring network a first number of clock cycles after the first warning signal;

transmitting a second warning signal on the counterclockwise ring network indicating that the command will be transmitted on the counterclockwise ring network a second number of clock cycles after the second warning signal, wherein the first warning signal and the second warning signal are transmitted during a same clock cycle;

transmitting, during the first number of clock cycles after the first warning signal, the command on the clockwise ring network; and transmitting, during the second number of clock cycles after the second warning signal, the command on the counterclockwise ring network, wherein the second number differs from the first number by exactly one clock cycle, wherein the plurality of nodes consists of an even number of nodes and a diagonal node of the first node is a node that is an equal number of hops from the first node via the clockwise ring network and the counterclockwise ring network, and wherein the method further comprises:

receiving, by a diagonal ring station associated with the diagonal node, a first set of partial responses to the command via the clockwise ring network;

receiving, by the diagonal ring station, a second set of partial responses to the command via the counterclockwise ring network;

creating, by the diagonal ring station, a set of combined responses based on the first set of partial responses and the second set of combined responses;

transmitting, by the diagonal ring station during a first cycle, the set of combined responses on the clockwise ring network; and transmitting, by the diagonal ring station during a second cycle subsequent to the first cycle, the set of combined responses on the counterclockwise ring network.

2. The method of claim 1, wherein the plurality of nodes consists of an even number of nodes and a diagonal node of the first node is a node that is an equal number of hops from the first node via the clockwise ring network and the counterclockwise ring network, and wherein the first warning signal, the second warning signal and the command are transmitted around the clockwise ring network and the counterclockwise ring network, respectively, until the first warning signal, the second warning signal and the command reach the diagonal node.

3. The method of claim 1, further comprising:

based at least in part on a determination that the clockwise ring network is available for transmission and the counterclockwise ring network is not available for transmission, performing a unidirectional execution of the command by:

transmitting the first warning signal on the clockwise ring network indicating that the command will be transmitted on the clockwise ring network the first number of clock cycles after the first warning signal; and transmitting, during the first number of clock cycles after the first warning signal, the command on the clockwise ring network.

4. The method of claim 3, wherein a determination to perform one of the unidirectional execution of the command and the bidirectional execution of the command is further based on a congestion level of the clockwise ring network and the counterclockwise ring network.

5. The method of claim 1, further comprising preventing an initiation of the bidirectional execution of the command based on a determination that a combined response associated with the command will collide with a combined response of a unidirectional execution of a previously executed command.

6. A multiprocessor chip comprising:

a plurality of nodes;

a plurality of ring stations, which are each associated with one of the plurality of node, that are interconnected via a clockwise ring network and a counterclockwise ring network, wherein a first ring station associated with a first node of the plurality of nodes is configured to:

receive a command for execution;

based at least in part on a determination that the clockwise ring network and the counterclockwise ring network are both available for transmission, perform a bidirectional execution of the command by:

transmit a first warning signal on the clockwise ring network indicating that the command will be transmitted on the clockwise ring network a first number of clock cycles after the first warning signal;

transmit a second warning signal on the counterclockwise ring network indicating that the command will be transmitted on the counterclockwise ring network a second number of clock cycles after the second warning signal, wherein the first warning signal and the second warning signal are transmitted during a same clock cycle;

transmit, during the first number of clock cycles after the first warning signal, the command on the clockwise ring network; and transmit, during the second number of clock cycles after the second warning signal, the command on the counterclockwise ring network, wherein the second number differs from the first number by exactly one clock cycle, wherein the plurality of nodes consists of an even number of nodes and a diagonal node of the first node is a node that is an equal number of hops from the first node via the clockwise ring network and the counterclockwise ring network, and wherein a diagonal ring station is configured to:

receive a first set of partial responses to the command via the clockwise ring network;

receive a second set of partial responses to the command via the counterclockwise ring network;

create a set of combined responses based on the first set of partial responses and the second set of combined responses;

transmitting, during a first cycle, the set of combined responses on the clockwise ring network; and transmitting, during a second cycle subsequent to the first cycle, the set of combined responses on the counterclockwise ring network.

7. The multiprocessor chip of claim 6, wherein the plurality of nodes consists of an even number of nodes and a diagonal node of the first node is a node that is an equal number of hops from the first node via the clockwise ring network and the counterclockwise ring network, and wherein the first warning signal, the second warning signal and the command are transmitted around the clockwise ring network and the counterclockwise ring network, respectively, until the first warning signal, the second warning signal and the command reach the diagonal node.

8. The multiprocessor chip of claim 6, wherein the first ring station is further configured to:

based at least in part on a determination that the clockwise ring network is available for transmission and the counterclockwise ring network is not available for transmission, perform a unidirectional execution of the command by:

transmitting the first warning signal on the clockwise ring network indicating that the command will be transmitted on the clockwise ring network the first number of clock cycles after the first warning signal; and transmitting, during the first number of clock cycles after the first warning signal, the command on the clockwise ring network.

9. The multiprocessor chip of claim 6, wherein a determination to perform one of the unidirectional execution of the command and the bidirectional execution of the command is further based on a congestion level of the clockwise ring network and the counterclockwise ring network.

10. The multiprocessor chip of claim 6, wherein the first ring station is further configured to prevent an initiation of the bidirectional execution of the command based on a determination that a combined response associated with the command will collide with a combined response of a unidirectional execution of a previously executed command.

11. A system comprising:

a memory having computer readable instructions; and a multiprocessor chip for executing the computer readable instructions, the multiprocessor chip comprising:

a plurality of nodes;

a plurality of ring stations, which are each associated with one of the plurality of node, that are interconnected via a clockwise ring network and a counterclockwise ring network, wherein a first ring station associated with a first node of the plurality of nodes is configured to:

receive a command for execution;

based at least in part on a determination that the clockwise ring network and the counterclockwise ring network are both available for transmission, perform a bidirectional execution of the command by:

transmit a first warning signal on the clockwise ring network indicating that the command will be transmitted on the clockwise ring network a first number of clock cycles after the first warning signal;

transmit a second warning signal on the counterclockwise ring network indicating that the command will be transmitted on the counterclockwise ring network a second number of clock cycles after the second warning signal, wherein the first warning signal and the second warning signal are transmitted during a same clock cycle;

transmit, during the first number of clock cycles after the first warning signal, the command on the clockwise ring network; and transmit, during the second number of clock cycles after the second warning signal, the command on the counterclockwise ring network, wherein the second number differs from the first number by exactly one clock cycle, wherein the plurality of nodes consists of an even number of nodes and a diagonal node of the first node is a node that is an equal number of hops from the first node via the clockwise ring network and the counterclockwise ring network, and wherein a diagonal ring station is configured to:

receive a first set of partial responses to the command via the clockwise ring network;

receive a second set of partial responses to the command via the counterclockwise ring network;

create a set of combined responses based on the first set of partial responses and the second set of combined responses;

transmitting, during a first cycle, the set of combined responses on the clockwise ring network; and transmitting, during a second cycle subsequent to the first cycle, the set of combined responses on the counterclockwise ring network.

12. The system of claim 11, wherein the plurality of nodes consists of an even number of nodes and a diagonal node of the first node is a node that is an equal number of hops from the first node via the clockwise ring network and the counterclockwise ring network, and

wherein the first warning signal, the second warning signal and the command are transmitted around the clockwise ring network and the counterclockwise ring network, respectively, until the first warning signal, the second warning signal and the command reach the diagonal node.

13. The system of claim 11, wherein the first ring station is further configured to:

based at least in part on a determination that the clockwise ring network is available for transmission and the counterclockwise ring network is not available for transmission, perform a unidirectional execution of the command by:

transmitting the first warning signal on the clockwise ring network indicating that the command will be transmitted on the clockwise ring network the first number of clock cycles after the first warning signal; and transmitting, during the first number of clock cycles after the first warning signal, the command on the clockwise ring network.

14. The system of claim 11, wherein a determination to perform one of the unidirectional execution of the command and the bidirectional execution of the command is further based on a congestion level of the clockwise ring network and the counterclockwise ring network.

* * * * *